(12) United States Patent
Ma et al.

(10) Patent No.: US 12,153,242 B2
(45) Date of Patent: Nov. 26, 2024

(54) LIGHT GUIDE LAYER FOR VEHICLE GLASS, VEHICLE GLASS AND VEHICLE INTERIOR LIGHTING SYSTEM

(71) Applicant: SAINT-GOBAIN GLASS FRANCE, Courbevoie (FR)

(72) Inventors: Siteng Ma, Shanghai (CN); Lu Wang, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/250,679

(22) PCT Filed: Nov. 5, 2021

(86) PCT No.: PCT/CN2021/128971
§ 371 (c)(1),
(2) Date: Apr. 26, 2023

(87) PCT Pub. No.: WO2022/095959
PCT Pub. Date: May 12, 2022

(65) Prior Publication Data
US 2023/0400619 A1    Dec. 14, 2023

(30) Foreign Application Priority Data

Nov. 5, 2020   (CN) .......................... 202011222784.4

(51) Int. Cl.
*F21V 8/00*    (2006.01)
*B32B 1/00*    (2006.01)
(Continued)

(52) U.S. Cl.
CPC .............. *G02B 6/0036* (2013.01); *B32B 1/00* (2013.01); *B32B 3/30* (2013.01);
(Continued)

(58) Field of Classification Search
CPC ........... G02B 6/0036; B32B 1/00; B32B 3/30; H01L 25/0756; H01L 33/60; H01L 2933/0091; B60K 35/00
See application file for complete search history.

(56) References Cited

U.S. PATENT DOCUMENTS 11,285,790 B2 *   3/2022   van Doleweerd .......................... B32B 17/10504
11,335,766 B2 *   5/2022   Malvaranta ............. H01L 33/38
(Continued)

FOREIGN PATENT DOCUMENTS

CN    103770696 A    5/2014
CN    104924989 A    9/2015
(Continued)

OTHER PUBLICATIONS

International Search Report as issued in International Patent Application No. PCT/CN2021/128971, dated Jan. 27, 2022.

*Primary Examiner* — Leah Simone Macchiarolo
(74) *Attorney, Agent, or Firm* — Pillsbury Winthrop Shaw Pittman LLP

(57) ABSTRACT

A light guide layer for vehicle glass, a vehicle glass and a vehicle interior lighting system are provided. The light guide layer or vehicle glass includes a transparent body or a glass body including a first surface and a second surface arranged opposite to each other, and the transparent body being adapted to be couple to vehicle glass, so as to receive light-source light emitted from a light source arranged at a predetermined position of a vehicle and allow the light-source light to propagate within the transparent body; and a light diffusion part formed in the transparent body or the glass body or on at least one of the first surface and the second surface and configured to diffusely reflect, scatter and/or refract the light-source light propagating to the light diffusion part to a predetermined area of at least one of the (Continued)

first surface and the second surface, so as to emit the light-source light out from the predetermined area.

20 Claims, 7 Drawing Sheets

(51) Int. Cl.
    *B32B 3/30*     (2006.01)
    *B32B 17/10*     (2006.01)
    *B60J 1/00*     (2006.01)
    *B60J 3/00*     (2006.01)
    *B60Q 3/62*     (2017.01)

(52) U.S. Cl.
    CPC .. *B32B 17/10036* (2013.01); *B32B 17/10541* (2013.01); *B32B 17/10623* (2013.01); *B32B 17/10761* (2013.01); *B32B 17/10788* (2013.01); *B60J 1/001* (2013.01); *B60J 3/00* (2013.01); *G02B 6/0041* (2013.01); *B32B 2605/00* (2013.01); *B60Q 3/62* (2017.02)

(56) References Cited

U.S. PATENT DOCUMENTS

| | | | |
|---|---|---|---|
| 2005/0238857 A1* | 10/2005 | Day | B32B 17/10045 |
| | | | 428/209 |
| 2015/0253486 A1* | 9/2015 | Verger | B60Q 3/51 |
| | | | 362/606 |
| 2015/0298601 A1* | 10/2015 | Bott | B32B 17/10541 |
| | | | 362/520 |
| 2018/0086028 A1* | 3/2018 | Berard | B60Q 1/268 |
| 2018/0370195 A1* | 12/2018 | Laluet | G02B 27/0101 |
| 2019/0016095 A1* | 1/2019 | Labrot | B60R 1/001 |
| 2019/0134952 A1* | 5/2019 | Varanasi | B32B 17/10036 |
| 2019/0193376 A1* | 6/2019 | Bauerle | H01L 33/62 |
| 2019/0299852 A1* | 10/2019 | Bauerle | B32B 17/10036 |

FOREIGN PATENT DOCUMENTS

| | | |
|---|---|---|
| CN | 106794747 A | 5/2017 |
| CN | 107471978 A | 12/2017 |
| CN | 109624837 A | 4/2019 |
| CN | 111487706 A | 8/2020 |

\* cited by examiner

LIGHT GUIDE LAYER FOR VEHICLE GLASS, VEHICLE GLASS AND VEHICLE INTERIOR LIGHTING SYSTEM

CROSS-REFERENCE TO RELATED APPLICATIONS

This application is the U.S. National Stage of PCT/CN2021/128971, filed Nov. 5, 2021, which in turn claims priority to Chinese patent application number 202011222784.4 filed Nov. 5, 2020. The content of these applications are incorporated herein by reference in their entireties.

FIELD

Embodiments of the present disclosure relate to a light guide layer, and more specifically, to a vehicle glass and a vehicle interior lighting system using the light guide layer.

BACKGROUND

A vehicle lighting system is one of necessary systems for safe driving of the vehicle. The vehicle lighting system mainly comprises exterior lighting luminaires, interior lighting luminaires, external signal lighting luminaires, and internal signal lighting luminaires etc. The vehicle interior lighting system consists of dome lights, instrument lights, foot lights, work lights and trunk lights to provide convenience to drivers and passengers. Due to the functional and aesthetic values of the vehicle interior lighting, the vehicle lighting market is flourishing. The development, to some extent, is driven by diversity in positions and functions of the vehicle interior (from roof console to foot room) lighting. Along with the progress of the automatic driving techniques, the vehicle interior lighting plays an increasingly important role in creating atmosphere, influencing the mood of passengers and providing entertainment.

The existing vehicle interior lighting system usually provides illumination by using light-emitting diodes as light sources to form bulbs, light strips, lights and light rings etc. The light-emitting diodes may be integrated near a door handle to illuminate a key hole, or function as a steering flash light on a rear mirror and lighting for a pedal and a cup holder etc. The shape of the luminescence indicator may be quite simple (direct light transmission), or extremely intricate to precisely satisfy the illumination requirements.

SUMMARY

Traditional vehicle interior lighting system has some drawbacks resulted from technical issues. For example, for some direct transmission lighting approaches, there may be problems such as dazzling light. In addition, in order to meet people's pursuit of continuous improvement in the quality of life, a growing number of automobile manufacturers plan to use non-traditional lighting and indicating system in the vehicle interior lighting system. Embodiments of the present disclosure provide a light guide layer and a vehicle glass providing illumination using the light guide layer, to solve or at least partially solve the above and other potential problems in the traditional vehicle interior lighting system.

In a first aspect of the present disclosure, a light guide layer for vehicle glass is provided. The light guide layer comprises a transparent body comprising a first surface and a second surface arranged opposite to each other, and adapted to be coupled to the vehicle glass, so as to receive light-source light emitted from a light source arranged at a predetermined position of a vehicle and allow the light-source light to propagate within the transparent body; and a light diffusion part formed in the transparent body or on at least one of the first surface and the second surface and constructed to diffusely reflect, scatter and/or refract the light-source light propagating to the light diffusion part to a predetermined area of at least one of the first surface and the second surface, so as to emit the light-source light out from the predetermined area.

In some embodiments, the light diffusion part comprises a microstructure portion arranged on at least one of the first surface and the second surface, wherein the microstructure portion is configured to diffusely reflect or scatter the light-source light propagating to the microstructure portion to a predetermined area of at least one of the first surface and the second surface while allowing light propagating in a direction perpendicular to the first surface or the second surface to pass therethrough.

In some embodiments, the microstructure portion comprises at least one of: protrusions formed on at least one of the first surface and the second surface by additive manufacturing; recesses formed on at least one of the first surface and the second surface by subtractive manufacturing.

In some embodiments, the microstructure portion is micrometer-sized or nanometer-sized.

In some embodiments, the microstructure portion is formed on at least one of the first surface and the second surface by at least one of machining, chemical etching, photolithography and UV gel curing.

In some embodiments, the transparent body is prefabricated to have a curvature matching with a curvature of the vehicle glass.

In some embodiments, the transparent body is deformable, so as not to affect changes of a direction of the light-source light made by the microstructure portion in a case where the transparent body is deformed to have a curvature matching with a curvature of the vehicle glass.

In some embodiments, the transparent body is adapted to be coupled to a visible area of the vehicle glass.

In some embodiments, the transparent body is adapted to be arranged on a surface of the vehicle glass.

In some embodiments, the vehicle glass comprises a laminated glass in which the transparent body is arranged.

In some embodiments, the light diffusion part comprises suspended particles arranged in the transparent body.

In some embodiments, the light diffusion part comprises an ink portion arranged on at least one of the first surface and the second surface.

In some embodiments, the transparent body is made by at least one of: polyethylene terephthalate, polycarbonate, polymethyl methacrylate, polyvinyl butyral, ethylene-vinyl acetate copolymer, thermoplastic polyurethane elastomer and terephthalic acid.

In some embodiments, the vehicle glass comprises a laminated glass and the transparent body is an interlayer between a first glass layer in the laminated glass facing interior of the vehicle and a second glass layer facing exterior of the vehicle.

In some embodiments, the light guide layer is crease-resistant.

In some embodiments, the light guide layer is ductile.

In some embodiments, the ink portion has anti-sticky property.

In some embodiments, the ink portion is compatible with a bending temperature.

In some embodiments, the ink portion has an L* value greater than 58 in a color space LAB.

In some embodiments, the light guide layer further comprises a heating-reflecting layer and/or a low emissivity layer arranged on a surface of the light guide layer.

In a second aspect of the present disclosure, a vehicle glass is provided. The vehicle glass comprises a glass body and the light guide layer according to the first aspect of the present disclosure.

In some embodiments, the light guide layer is arranged on a surface of the glass body via an interlayer.

In some embodiments, the vehicle glass further comprises a protective layer arranged on a surface of the light guide layer away from the glass body.

In some embodiments, the glass body comprises a first glass layer and a second glass layer, and the light guide layer is arranged between the first glass layer and the second glass layer via an interlayer, or the light guide layer is an interlayer that bonds the first glass layer with the second glass layer.

In some embodiments, the light guide layer is arranged between the first glass layer and the second glass layer via the interlayer, the light diffusion part comprises a microstructure portion arranged on at least one of the first surface and the second surface, and wherein the microstructure portion is configured to diffusely reflect, scatter and/or refract the light-source light propagating to the microstructure portion to a predetermined area of at least one of the first surface and the second surface while allowing light propagating in a direction perpendicular to the first surface or the second surface to pass therethrough, wherein the interlayer has a refractive index different from the microstructure portion.

In some embodiments, the glass body is provided with a light-source hole for receiving at least a part of a light source.

In some embodiments, the light-source hole is formed such that the light source received in the light-source hole is arranged in a non-visible area of the vehicle glass.

In some embodiments, the vehicle glass further comprises a heating-reflecting layer and/or a low emissivity layer arranged inside or on a surface of the vehicle glass.

In a third aspect of the present disclosure, a vehicle glass is provided. The vehicle glass comprises a glass body comprising a first surface and a second surface arranged opposite to each other, and configured to receive light-source light emitted from a light source arranged at a predetermined position of a vehicle and allow the light-source light to propagate within the glass body; and a light diffusion part formed in the glass body or on at least one of the first surface and the second surface and configured to diffusely reflect, scatter and/or refract the light-source light propagating to the light diffusion part to a predetermined area of at least one of the first surface and the second surface, so as to emit the light-source light out from the predetermined area.

In some embodiments, the light diffusion part comprises a microstructure portion arranged on at least one of the first surface and the second surface, wherein the microstructure portion is configured to diffusely reflect, scatter and/or refract the light-source light propagating to the microstructure portion to a predetermined area of at least one of the first surface and the second surface while allowing light propagating in a direction perpendicular to the first surface or the second surface to pass therethrough.

In some embodiments, the light diffusion part comprises an ink portion arranged on at least one of the first surface and the second surface.

In some embodiments, the light diffusion part comprises a coating layer or a plating layer applied to a surface of the vehicle glass or to interior of the vehicle glass.

In some embodiments, the light diffusion part comprises suspended particles arranged in the glass body.

In some embodiments, the vehicle glass further comprises a heating-reflecting layer and/or a low emissivity layer arranged inside or on a surface of the vehicle glass.

In some embodiments, the ink portion has anti-sticky property.

In some embodiments, the ink portion is compatible with a bending temperature.

In some embodiments, the ink portion has an L* value greater than 58 in a color space LAB.

In some embodiments, the light guide layer further comprises a heating-reflecting layer and/or a low emissivity layer disposed on a surface of the light guide layer.

In a fourth aspect of the present disclosure, a vehicle interior lighting system is provided. The vehicle interior lighting system comprises the vehicle glass according to the second and third aspects of the present disclosure; and a light source arranged adjacent to at least a part of the vehicle glass and/or inside the vehicle glass.

In some embodiments, the light source comprises at least one of a continuum light source, a linear light source and a point light source.

In some embodiments, the light source is arranged around at least one of first glass layer and second glass layer of the vehicle glass.

In some embodiments, at least a part of the vehicle glass comprises a light guide layer.

In some embodiments, the light source is arranged in at least one of first glass layer and second glass layer of the vehicle glass via a light-source hole.

It is to be understood that the contents described in this Summary are not intended to determine key or fundamental features of the embodiments of the present disclosure, or limit the scope of the present disclosure. Other features of the present disclosure will become easy to understand through the following description.

Optionally, in addition to the advantages of a large area of light source and gentle light rays, the proposed illumination approach does not additionally occupy the limited space inside the vehicle, making the interior of the vehicle more concise.

BRIEF DESCRIPTION OF THE DRAWINGS

Through the following more detailed description of the example embodiments with reference to the accompanying drawings, the above and other objectives, features and advantages of the present disclosure will become more apparent. In the example embodiments of the present disclosure, same reference sign usually indicates the same component.

Throughout the drawings, same or similar reference signs indicate same or similar elements.

DETAILED DESCRIPTION OF EMBODIMENTS

The present disclosure is now described with reference to several example embodiments. It is to be understood that description of those embodiments is merely to enable those skilled in the art to better understand and further implement the present disclosure and is not intended for limiting the scope of the technical solution disclosed herein.

As used herein, the term "comprises" and its variants are to be read as open-ended terms that mean "comprises, but is not limited to." The term "based on" is to be read as "based at least in part on." The terms "one embodiment" and "embodiment" are to be read as "at least one embodiment." The term "a further embodiment" is to be read as "at least a further embodiment." The terms "first", "second" and so on can refer to same of different objects. Other explicit and implicit definitions may be comprised in the following text. The definitions of the terms should be consistent throughout the whole description unless indicated otherwise in the context.

At present, most vehicle interior lighting systems still rely on light-emitting diodes, which illuminate via light guide or lampshade in the direct transmission manner. For example, the illuminating light or reading light disposed in a ceiling of the vehicle usually provides the illumination using light-emitting diodes as a light source in combination with a lampshade.

On the one hand, the above illumination approach may have some drawbacks. For example, although a transmission lampshade is used, the light emitted in the direct transmission manner is still uneven. The light rays near the light source are strong and dazzling. On the other hand, with the continuous improvement of people's pursuit of quality of life, the above vehicle interior lighting approach gradually fails to meet people's needs.

Embodiments of the present disclosure provide a light guide layer for a vehicle glass, such that the vehicle lighting system can be partially disposed in the vehicle glass, to solve or at least in part solve the above or other potential problems in the vehicle interior lighting system.

Figure 1:
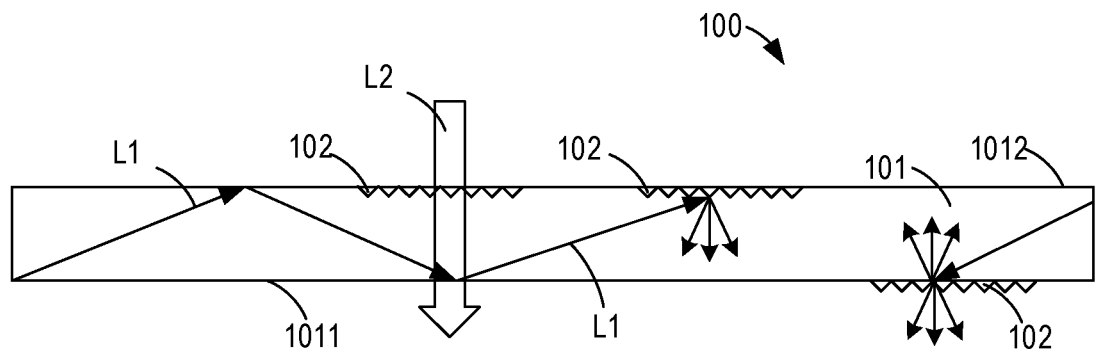
FIG. 1 illustrates a simplified schematic diagram of a light guide layer in accordance with embodiments of the present disclosure.

FIG. 1 illustrates a simplified schematic diagram of a light guide layer 100 for a vehicle glass 200 in accordance with embodiments of the present disclosure. The light guide layer refers to a layered structure that can be applied to a vehicle glass, and may comprise but is not limited to, a light guide film, a light guide sheet, a light guide plate and a light guide coating layer etc. The vehicle glass 200 herein comprises, but is not limited to, a sunroof glass, a front windshield glass, a rear window glass, a door window glass and/or a corner glass etc. As shown in FIG. 1, the light guide layer 100 in accordance with embodiments of the present disclosure generally comprises a transparent body 101 and a light diffusion part formed on the transparent body 101. The transparent body 101 has a film-like, sheet-like or plate-like form and comprises two surfaces arranged opposite to each other. To facilitate the description, the two surfaces are respectively referred to as a first surface 1011 and a second surface 1012 in the following text.

Diffusion here indicates at least one of diffuse reflection, scattering and/or refraction of light. In other words, the light diffusion part can diffusely reflect, scatter and/or refract the light arriving at the light diffusion part. After the diffuse reflection, the light is propagated in a plurality of directions different from the original propagating direction. Scattering means that the light is propagated in a plurality of directions deviated from the original propagating direction to some degree. The plurality of directions in the scattering are spread out in a substantially coned shape, and have a main direction along a center of the cone-shaped body. Since the refractive indices are different by little, the deviation of the main direction from the original propagating direction is small, e.g., within a range of 30 degrees. The refraction means that light is propagated in a direction having a small deviation from the original propagating direction. Likewise, the refraction direction is deviated from the original propagating direction within a range of 30 degrees.

It should be explained that the transparent body 101 herein may comprise any suitable structure that can be arranged in the vehicle glass 200 in accordance with different embodiments. For example, the transparent body may be arranged on a surface of the vehicle glass 200 or may be a layer in a form of film in the vehicle glass 200. In some alternative embodiments, the transparent body may also be an interlayer for bonding two glass layers within the laminated glass or any other suitable layers. It will be further elaborated in the following text.

The laminated glass described herein refers to a composite glass product formed by two or more sheets of glass with one or more layers of organic polymer interlayer films sandwiched therebetween, which are permanently bonded together after being subject to special high-temperature pre-load (or vacuum pumping) and high-temperature high-pressure process. When the transparent body 101 is coupled to the vehicle glass 200, the light guide layer 100 can receive light-source light L1 emitted from the light source 301 arranged at the predetermined position of the vehicle and allow the light-source light L1 to propagate within the transparent body 101.

According the lighting requirements and the arrangement of the vehicle interior, the inventors re-designed the light guide layer 100, such that the light guide layer 100, when arranged in the vehicle glass 200, can receive the light-source light L1 and enable the light-source light L1 to propagate within it. The propagation of the light-source light L1 within the transparent body 101 comprises reflection and refraction of the light within the first surface 1011 and the second surface 1012 as shown in FIG. 1. The light-source light L1 may enter inside the transparent body 101 from at least one of the first surface 1011, the second surface 1012 and edges of the transparent body 101 through incidence, refraction and scattering etc. In addition, most of the light-source light L1 will be reflected inside the transparent body 101 to propagate within the transparent body 101.

The light diffusion part is configured to cause the light-source light propagating to the light diffusion part to be diffusely reflected, scattered and/or refracted to a predetermined area of at least one of the first surface 1011 and the second surface 1012, so as to emit the light-source light L1 out from the predetermined area. Taking a microstructure portion as an example, the diffuse reflection, scattering and/or refraction described herein do not mean that the light-source light L1 propagates along all directions disorderly under the act of the microstructure portion 102. Instead, the microstructure portion 102 is configured such that the light-source light L1 arriving at the microstructure portion 102 can propagate within a predetermined range of angles so that the light-source light L1 after being diffusely reflected, scattered and/or refracted is emitted out from the predetermined area. For example, in some embodiments, the light-source light L1 arriving at the microstructure portion 102 can continue to propagate within a range from −60° and 60° or a greater range relative to a normal direction (i.e., a direction perpendicular to the first surface). When the light propagates within the above range or a greater range, the microstructure portion 102 is configured to allow more light to propagate within the range of angles near the normal. As a result, the closer to the normal direction, the stronger the light diffusely reflected, scattered and/or refracted by the microstructure portion, thereby further enhancing the lighting effect. However, it is to be appreciated that the same is true for the case where the light diffusion part is an ink portion or suspended particles, which will not be repeated in the following text.

By saying that the light-source light L1 is emitted out from the predetermined area, it means that the predetermined area can emit light when observed from the outside of the guide layer 100 or the vehicle glass 200. That is, the predetermined area is equivalent to the light source when observed from the outside, which make the predetermined area create a light source effect and illuminate the interior of the vehicle. On the one hand, the light is emitted through diffuse reflection, scattering and/or refraction in this lighting approach, which makes the light becomes more even and gentle in comparison to the traditional direct light transmission approach, to thereby improve the user experience. On the other hand, the lighting approach is fulfilled using the vehicle glass 200. In addition to advantages of a large area of light source and gentle light rays, the lighting approach does not additionally occupy the limited space inside the vehicle, making the interior of the vehicle more concise.

In some embodiments, the light diffusion part comprises a microstructure portion 102, which is formed on at least one of the first surface 1011 and the second surface 1012. The microstructure portion 102 is transparent when the light source is switched off. The microstructure portion 102 is configured to allow the light L2 that propagates perpendicular to the first surface 1011 or the second surface 1012 to pass therethrough, as shown in FIG. 1. It is to be understood that "perpendicular" here refers to substantially perpendicular. For example, when the angle between the light and the first surface 1011 or the second surface 1022 is within a range from 85° to 95°, the light is considered as being perpendicular to the first surface 1011 or the second surface 1022. The above arrangement allows the entire transparent body 101 comprising the microstructure portion 102 being transparent when the guide layer 100 is observed in a direction perpendicular to it.

Accordingly, in some embodiments, the transparent body 101 may be coupled to a visible area of the vehicle glass 200 without affecting the field of view of the vehicle glass 200. On the condition that the above transparency requirements are satisfied by the microstructure portion 102, the microstructure portion 102 can diffusely reflect, scatter and/or refract the light-source light L1 propagating to the microstructure portion 102 to a predetermined area of at least one of the first surface 1011 and the second surface 1012, such that the light-source light L1 is emitted out from the predetermined area.

FIG. 1 illustrates the case where the light-source light L1 propagating to the microstructure portion 102 is diffusely reflected. As shown in FIG. 1, when the light-source light L1 irradiates the microstructure portion 102 arranged at the first surface 1011, the microstructure portion 102 can diffusely reflect the light-source light L1 to a predetermined area of the second surface 1012, and vice versa. Alternatively or additionally, in some embodiments, when the light-source light L1 irradiates the microstructure portion 102 arranged at the first surface 1011, the microstructure portion 102 also can scatter or refract the light-source light L1 to a predetermined area of the first surface 1011, thereby emitting the light out from the predetermined area.

The lighting effect is further boosted by appropriately setting the microstructure portion 102. For example, when it is necessary to cause the light-source light L1 to emit out from the predetermined area of the second surface 1012 through diffuse reflection, the microstructure portion 102 on the first surface 1011 may be processed into a shape or structure that facilitates the diffuse reflection. Alternatively or additionally, when it is necessary to cause the light-source light L1 to emit out from the predetermined area of the second surface 1012 through scattering, the microstructure portion 102 on the second surface 1012 may be processed into a shape or structure that gives convenience to scattering.

Moreover, by using the lighting approach with the light guide layer 100 arranged in the vehicle glass 200, the shape of the light-emitting area can be flexibly adjusted by changing the shape of the predetermined area. For example, in some embodiments, the predetermined area may be the entire surface of the first surface 1011 and/or the second surface 1012 of the light guide layer 100, which may be fulfilled by providing the microstructure portion 102 over the entire surface of the first surface 1011 and/or the second surface 1012. In some alternative embodiments, the predetermined area may also be a part of the first surface 1011 and/or the second surface 1012. For example, the predetermined area may comprise one or more regular shapes and graphics having various irregular shapes. In some embodiments, the regular shapes may comprise, but are not limited to, circle, ellipse, triangle, rectangle, pentagon, five-pointed star, hexagon and octagon etc. These shapes may form a variety of patterns individually or in combination. In some embodiments, the predetermined area may also have irregular shapes of different graphics, such as profile of animals, tools, plants and identifications etc. This makes the lighting approach with the light guide layer 100 more flexible, thereby further improving the user experience.

In some embodiments, the light guide layer 100 may be divisible, which means that the diffuse reflection, scattering or refraction of the light-source light L1 by the microstructure portion 102 would not be affected in the case where the light guide layer 100 is cut. For example, users or automobile manufacturers may cut the light guide layer 100 into desired size as needed in accordance with the size of the vehicle glass 200. This enables the light guide layer 100 to be manufactured into a roll, making the manufacturing of the light guide layer 100 easier. In addition, the light guide layer 100, which is set to be divisible, can be applied to the vehicle glass of different specifications, so as to improve the applicability of the light guide layer 100.

In some embodiments, the above regular or any other irregular shapes of the predetermined area may be implemented with the light diffusion part in a regular or irregular shape. For example, taking the light diffusion part comprising the microstructure portion 102 as an example, the microstructure portion 102 may be set to have a desired shape, such that the light-source light L1 propagating to the microstructure portion 102 may be emitted in the shape of the microstructure portion 102 after being diffusely reflected, scattered or refracted by the microstructure portion 102, thereby realizing the shape of the predetermined area, i.e., the shape of the light-emitting area.

It is to be understood that the above embodiments where the light diffusion part is explained to have any suitable shapes or structures by the example of the microstructure portion 102 are merely illustrative, without suggesting any limitation as to the scope of the present disclosure. In addition to being formed in the light guide layer, the light diffusion part may also be formed in the vehicle glass, and the microstructure portion 102 may also be formed on the glass. Additionally, the same is true for the case where the light diffusion part comprises other structures (e.g., suspended particles or ink portion to be described in the following). In other words, the layout of the suspended particles and the form of the ink portion to be described below may also be provided with a predetermined shape or structure, allowing the light to be emitted out from the predetermined area having the corresponding shape or image, which will not be repeated in the text below.

In some embodiments, the size of the microstructure portion 102 is micrometer-sized or nanometer-sized. For example, the microstructure portion 102 may be sized from several nanometers to hundreds of nanometers. In some alternative embodiments, the size of the microstructure portion 102 may also have a range from several microns to hundreds of microns. The wide range of size for the microstructure portion 102 makes the light guide layer 100 more widely used.

In some embodiments, the microstructure portion 102 may be formed on the transparent body 101 by additive and/or subtractive manufacturing. For example, the microstructure portion 102 may be protrusions formed on at least one of the first surface 1011 and the second surface 1012 through additive manufacturing. In some embodiments, the additive manufacturing may comprise curing gel by UV. The additive manufacturing allows the microstructure portion 102 and the transparent body 101 to be manufactured separately using different materials and then coupled together, thereby facilitating the diversification of the arrangement of the microstructure portion 102. For example, a photoresist is prepared first and a predetermined pattern is then etched on the photoresist by photolithography. Afterwards, for example, the liquid UV gel is coated on the etched pattern, and then the matrix materials, such as polyethylene terephthalate (PET) or polycarbonate (PC), are applied to the liquid UV gel. The UV curing is subsequently performed and the photoresist having a predetermined pattern etched by the photolithography is removed. Accordingly, the microstructure portion 102 is formed on the transparent body 101. Of course, in some embodiments, in a case of additive manufacturing, the microstructure portion 102 may also be integrally formed on the transparent body 101 by using the same material as the transparent body 101 while manufacturing the transparent body 101.

Alternatively or additionally, the microstructure portion 102 may also be recesses formed on at least one of the first surface 1011 and the second surface 1012 through subtractive manufacturing. In some embodiments, the subtractive manufacturing comprises, but is not limited to, machining, chemical etching or photolithography. For example, after the transparent body 101 is formed, the microstructure portion 102 may be formed on the specified area of the first surface 1011 and/or second surface 1012 of the transparent body 101 by photolithography. Regardless of whether it is an additive manufacturing or subtractive manufacturing, the diversified manufacturing approaches can enable the light guide layer 100 to be manufactured more easily, thereby allowing the light guide layer 100 to be produced in a cost-effective way.

Figure 2:
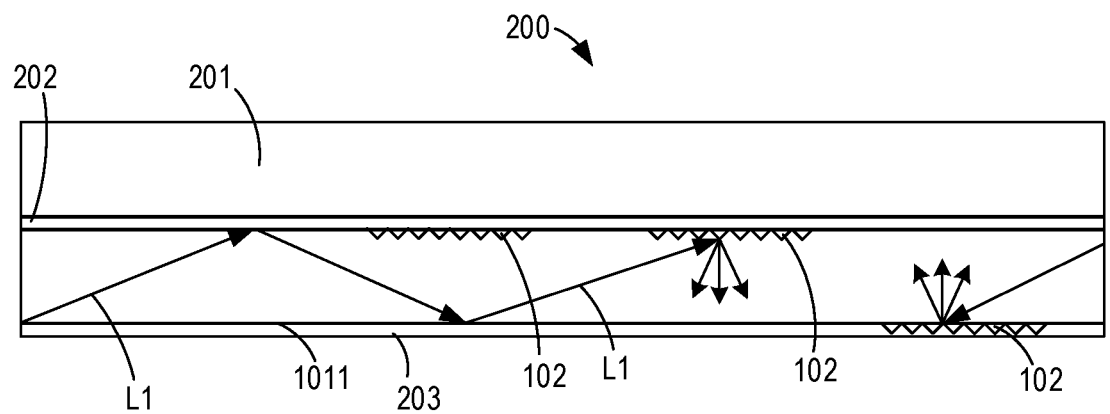
FIGS. 2 and 3 illustrate schematic diagrams of using the vehicle glass comprising microstructure portions in accordance with embodiments of the present disclosure.

The transparent body 101 in which the microstructure portion 102 is arranged may be arranged in the vehicle glass 200 in any suitable ways. For example, the transparent body 101 may be directly arranged on the surface of the vehicle glass 200, as shown in FIG. 2. The arrangement is also applicable to the case where the vehicle glass 200 is made of a single layer of glass. Of course, it is to be understood that such arrangement is also applicable to the case where the vehicle glass 200 is made of laminated glass. In the case where the vehicle glass 200 is made of laminated glass, the transparent body 101 may be arranged between the laminated glass, e.g., between two glass layers within the laminated glass, which will be further discussed in the following.

Figure 3:
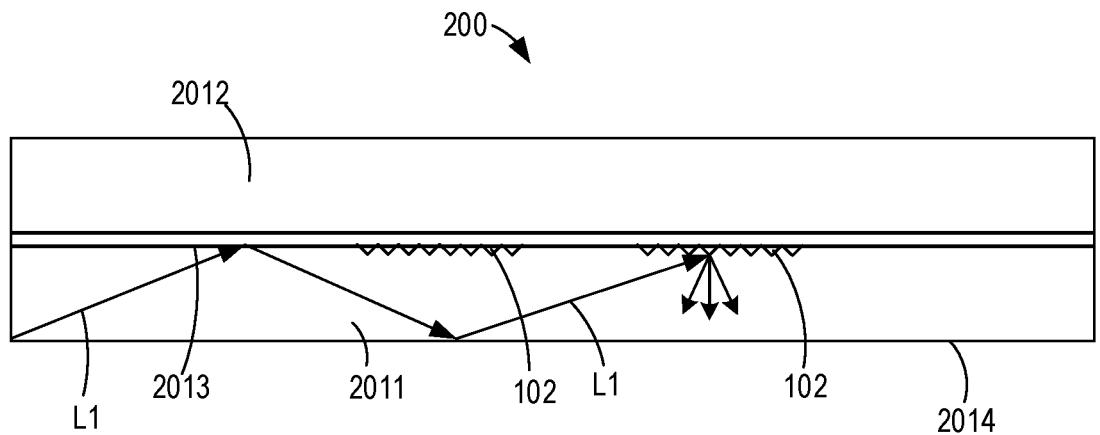

In some alternative embodiments, the vehicle glass 200 comprises a glass body 201, and the microstructure portion 102 may be formed on at least one surface of the glass body 201. The microstructure portion 102 is transparent when the light source is switched off. Optionally, the vehicle glass 200 comprises the laminated glass, such as a glass layer facing interior of the vehicle (hereinafter referred to as "first glass layer 2011") and a glass layer facing exterior of the vehicle (hereinafter referred to as "second glass layer 2012"). In some embodiments, the microstructure portion 102 is formed on a first surface 2013 of the first glass layer 2011 facing the exterior of the vehicle as shown in FIG. 3. The arrangement may further improve the lighting effect. Although not shown in FIG. 3, the microstructure portion 102 may also be formed on a second surface 2014 of the first glass layer 2011 facing the interior of the vehicle. Moreover, the microstructure portion 102 may also be formed on an outer surface of the second glass layer 2012 facing the exterior of the vehicle, or an inner surface of the second glass layer 2012 facing the interior of the vehicle.

Figure 4:
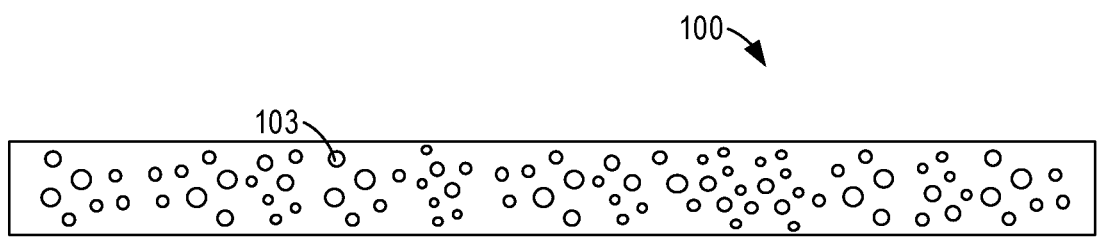
FIG. 4 illustrates a schematic diagram of the light guide layer comprising suspended particles in accordance with embodiments of the present disclosure.

FIG. 4 illustrates a further embodiment of the light guide layer 100. In the embodiment shown in FIG. 4, the light diffusion part may comprise suspended particles 103 arranged in the transparent body 101. The suspended particles 103 can diffusely reflect, scatter and/or refract the light-source light L1 propagating to the suspended particles 103 to a predetermined area of at least one of the first surface 1011 and the second surface 1012, so as to emit the light-source light L1 out from the predetermined area. As mentioned above, the layout or arrangement of the suspended particles 103 in the transparent body 101 corresponds to the predetermined shape of the predetermined area. That is, the predetermined shape of the predetermined area is configured by reasonably setting the layout of the suspended particles 103 in the transparent body 101. In some embodiments, the light guide layer 100 containing the suspended particles 103 may be molded by extrusion.

In some embodiments, the suspended particles 103 may be distributed in the transparent body 101 uniformly or non-uniformly by a predetermined rule. For example, in some embodiments, the suspended particles 103 may increment from one edge of the transparent body 101 to another edge, causing a gradual change in the brightness of the light emitted out from the predetermined area. In other words, in some embodiments, the density of the suspended particles 103 in the transparent body 101 may affect the brightness of the light that is diffusely reflected, scattered and/or refracted by the suspended particles 103. Besides the density of the suspended particles 103, factors that may affect the light brightness comprise transparency, shape, size, composition and surface roughness etc., of the suspended particles 103.

In some embodiments, the suspended particles 103 may be transparent, semi-transparent or even opaque. In embodiments where the suspended particles 103 are transparent or semi-transparent, the suspended particles 103 and the transparent body 101 have different refractive indices, so as to ensure a good lighting effect. In some embodiments, size, shape, density, composition and surface roughness of the suspended particles 103 may be chosen to promote the lighting effect. For example, in order to ensure the transparency of the light guide layer 100, the size and the density of the suspended particles could not be set to be large. In this event, to ensure the lighting effect, the suspended particle 103 may be shaped to promote diffuse reflection, scattering and/or refraction of the light-source light L1 arriving at the suspended particle 103 towards the predetermined area. In view of the requirements, the shape of the suspended particle 103 comprises, but is not limited to, sphere, ellipsoid, cube, polygon or diamond.

Figure 5:
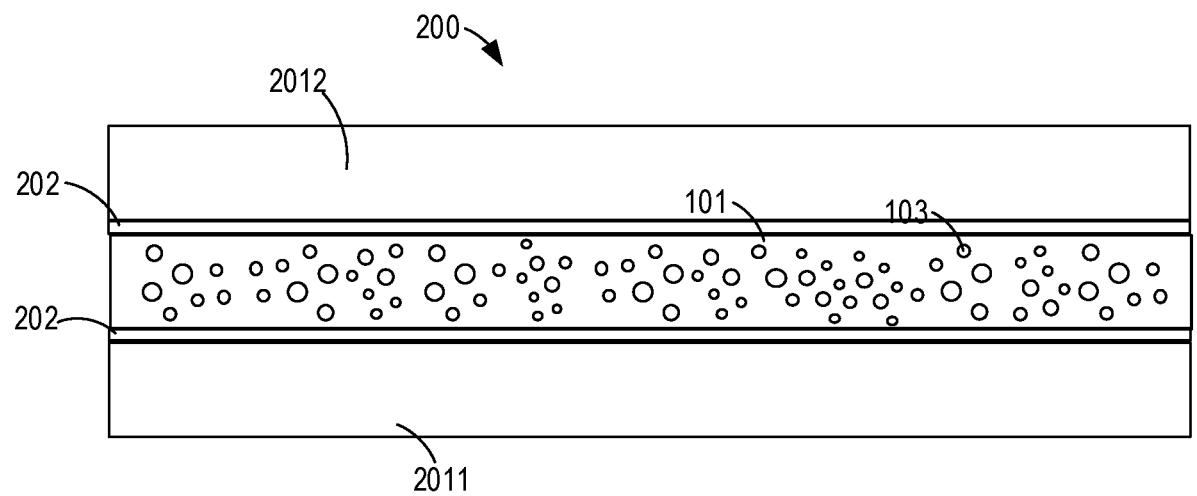
FIGS. 5 to 8 illustrate schematic diagrams of the vehicle glass using the light guide layer containing suspended particles in accordance with a plurality of embodiments of the present disclosure.

The transparent body 101 comprising the suspended particles 103 may also be arranged in the vehicle glass 200 in any suitable ways. For example, in some embodiments, the transparent body 101 may be made into a thin film from at least one of polyethylene terephthalate (PET), polycarbonate (PC), polymethyl methacrylate (PMMA), thermoplastic polyurethane elastomer (TPU), terephthalic acid (TPA) and any other suitable materials without sticky property. The transparent body 101 in the form of a thin film may be arranged between two glass layers within the laminated glass via the interlayer 202, such as an adhesive layer, as shown in FIG. 5. In some alternative embodiments, the transparent body 101 in the form of a thin film may also be arranged on the surface of the vehicle glass through the interlayer 202.

Figure 6:
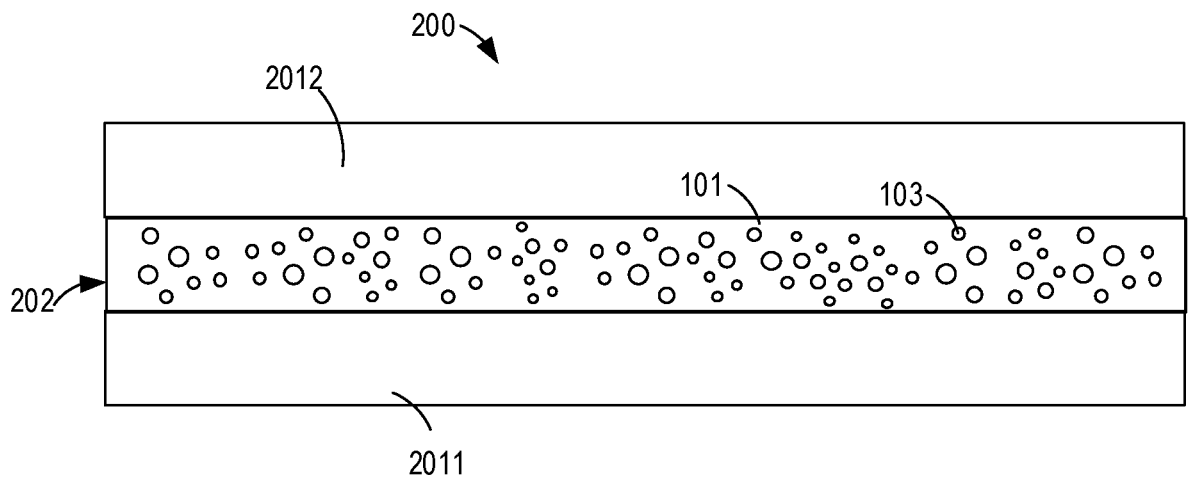

In some embodiments, the transparent body 101 may be an adhesive layer made by at least one of polyvinyl butyral (PVB), ethylene-vinyl acetate copolymer (EVA), polyolefin elastomer (POE) and any other suitable materials with sticky property. For example, the transparent body 101 in the form of an adhesive layer may be arranged between two glass layers within the laminated glass, as shown in FIG. 6. In these embodiments, the light guide layer 100 also can bond the two glass layers while playing a role of illuminating, which further reduces the thickness of the vehicle glass.

Figure 7:
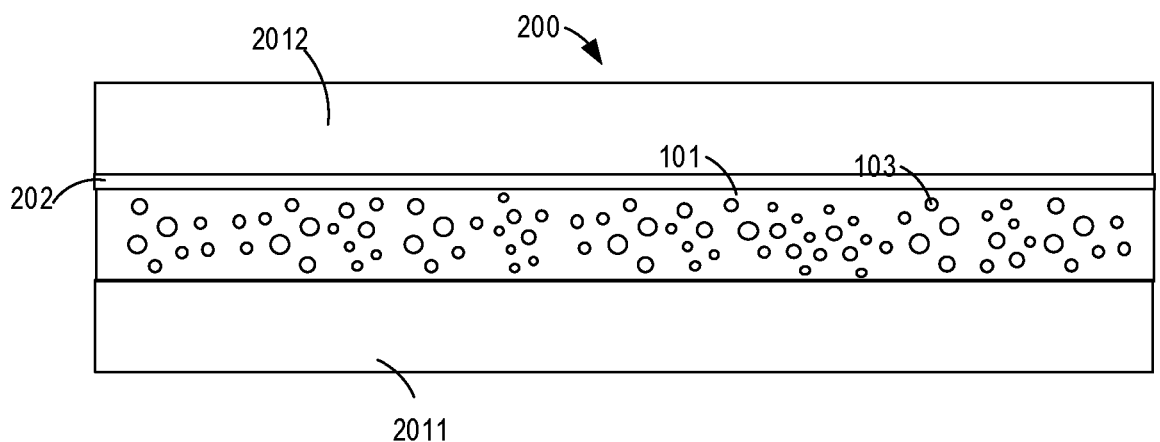
Figure 8:
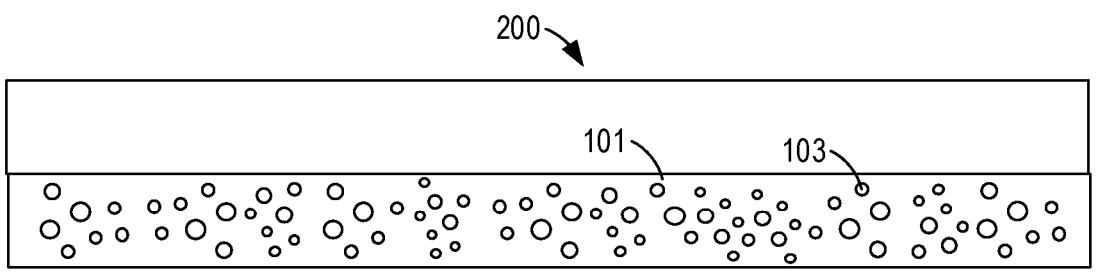

In some embodiments, the transparent body 101 comprising the suspended particles 103 may be applied inside the vehicle glass 200 or on the surface of the vehicle glass in a form of a coating. For example, in some embodiments, during the manufacturing of the vehicle glass 200, the transparent body 101 may be bonded to the second glass layer 2012 through the interlayer 202 after being applied as a coating on the outer surface of the first glass layer 2011 facing the interior of the vehicle, as shown in FIG. 7. In some alternative embodiments, the transparent body 101 comprising the suspended particles 103 may be applied as a coating on the surface of the vehicle glass 200 (comprising laminated glass or single-layer glass), as shown in FIG. 8. Due to the above diversified arrangements, the light guide layer 100 can be more easily applied to the vehicle glass 200 to fulfill the lighting effect.

In some embodiments, the suspended particles 103 may also be directly formed in the glass body 101, to thereby diffusely reflect, scatter or refract the light-source light which is entering the glass body 101 to achieve the lighting of the glass body 101 on the predetermined area. The arrangement further reduces the number of layers contained in the vehicle glass 200, lowers the thickness of the vehicle glass 200 and makes the manufacturing easier.

Figure 9:
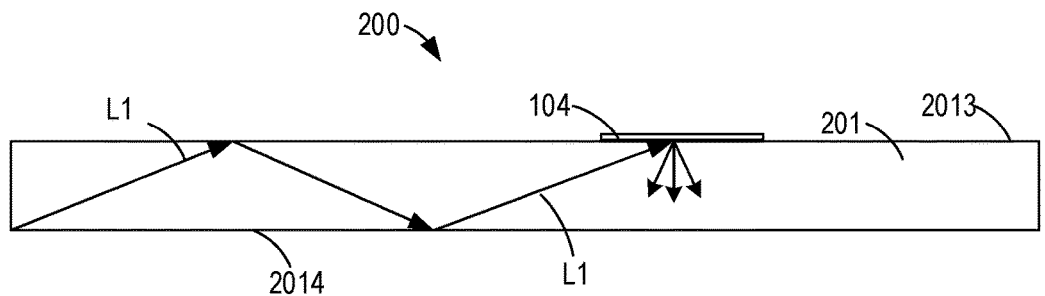
FIG. 9 illustrates a schematic diagram of the vehicle glass of the light guide layer comprising the ink portion in accordance with embodiments of the present disclosure.

Alternatively or additionally, in some embodiments, the light diffusion part may comprise an ink portion 103 disposed on at least one of the first surface 2013 and the second surface 2014 of the glass body 201, as shown in FIG. 9. The ink is made of varnish as the base material and added with pigment grinding, which will show a magneto-optical color and have a hard coating film after the coating is dried. The glass body 201 comprising the ink portion 103 may also be arranged in the vehicle glass 200 in any suitable ways. For example, in some embodiments, the glass body 201 may be the first glass layer 2011 in the laminated glass facing the interior of the vehicle. In these embodiments, the ink portion 103 may be arranged on the first surface 2013 or the second surface 2014 of the first glass layer 2011 by plating or coating.

In some alternative embodiments, the transparent body 101 may also be the interlayer of the laminated glass for bonding two glass layers. In other words, in these embodiments, the ink portion 103 may be arranged on any surface of the interlayer. In some embodiments, the ink portion 103 may be arranged on the surface of the interlayer facing the interior of the vehicle to ensure the lighting effect. In some alternative embodiments, the transparent body 101 may also be manufactured in the form of a thin film and further arranged inside the vehicle glass 200 or on the surface thereof.

In some embodiments, the ink portion 103 is anti-sticky, to prevent it from sticking to a further uncoated/unapplied one of the two glass layers when being bent, from sticking to the process equipment, from sticking to the molds and/or from sticking to the conveyors etc.

In some embodiments, the ink portion 103 is compatible with the bending temperature, such as a temperature over 600° C.

In some embodiments, the ink portion, for example has an L* value greater than 58 in color space CIELAB under reflection mode. This will be further elaborated in the following text.

Considering the special cases of the vehicle glass 200, the light guide layer 100 is processed to be crease-resistant in some embodiments, to further enhance the lighting effect. In other words, the light guide layer 100 is configured to not crease when the light guide layer 100 is applied to the vehicle glass 200 having a curved shape, so as not to affect the diffuse reflection, scattering or refraction of the light by the light diffusion part. Alternatively or additionally, the light guide layer 100 may also be configured to be ductile. It means that the light guide layer 100 can be stretched to adapt to the shape of the vehicle glass 200 to be applied for example, which may reduce the requirements on the accuracy of the manufacturing and/or the cutting size of the light guide layer 100, to thereby boost the efficiency. In addition, being ductile also means that even if the light guide layer 100 is stretched when it is assembled on the vehicle glass 200, it will not affect the diffuse reflection, scattering or refraction of the light-source light L1 by the light diffusion part, thereby ensuring the lighting effect. The crease-resistant and ductile properties of the light guide layer 100 may be implemented by a reasonable material selection. For example, in some embodiments, the light guide layer 100 may be manufactured by PET materials with good crease-resistant and ductile properties.

Alternatively or additionally, in some embodiments, the transparent body 101 may also be prefabricated in accordance with a curvature of the vehicle glass 200 to have a matching curvature. For example, when the vehicle glass 200 having a predetermined curvature is produced on a large scale, prefabricating the transparent body 101 with a predetermined curvature matching with the curvature of the vehicle glass 200 may further lower the risk of being creased caused by different curvatures, so that the adaptability between the light guide layer 100 and the vehicle glass 200 is thus improved, to thereby ensure the lighting effect.

In some alternative embodiments, the transparent body 101 may be deformable, so as not to affect the changes of a direction of the light-source light L1 made by the light diffusion part in a case where the transparent body 101 is deformed to have a curvature matching with the curvature of the vehicle glass 200. That is, in this event, there is no requirement on the curvature of the transparent body 101. In addition, the transparent body 101 may be applied to the vehicle glass 200 having any curvature, so as to improve the applicability of the light guide layer 100.

A vehicle glass 200 and a vehicle interior lighting system 300 comprising the vehicle glass 200 are also provided in accordance with embodiments of the present disclosure. FIGS. 10 to 14 illustrate the vehicle glass 200 in accordance with embodiments of the present disclosure and various embodiments of the vehicle interior lighting system 300 comprising the vehicle glass 200. As shown in FIGS. 10 to 14, the vehicle glass 200 in accordance with embodiments of the present disclosure may comprise the glass body 201 and the light guide layer 100 described above. The vehicle interior lighting system 300 also comprises the light source 301 besides the vehicle glass 200. The light source 301 mentioned herein may refer to a direct light source 301, or a light source that radiates light outwardly via a light guide. The direct light source 301 refers to a light source 301 that directly radiates light after being turned on, such as light-emitting diodes etc. Embodiments of the vehicle glass 200 and the vehicle interior lighting system 300 are described below mainly by taking an example of the microstructure portion 102 serving as the light diffusion part. It should be understood that embodiments in which the light diffusion part is present for example in the form of suspended particles or an ink portion are also similar and will not be repeated below.

Figure 10:
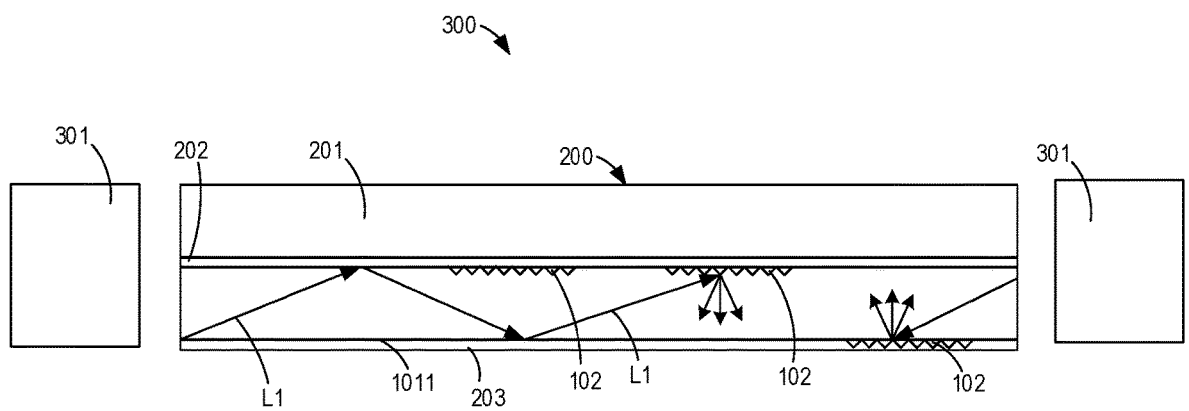
FIGS. 10 to 14 illustrate schematic diagrams of the vehicle interior lighting system comprising the light guide layer in accordance with embodiments of the present disclosure.
Figure 11:
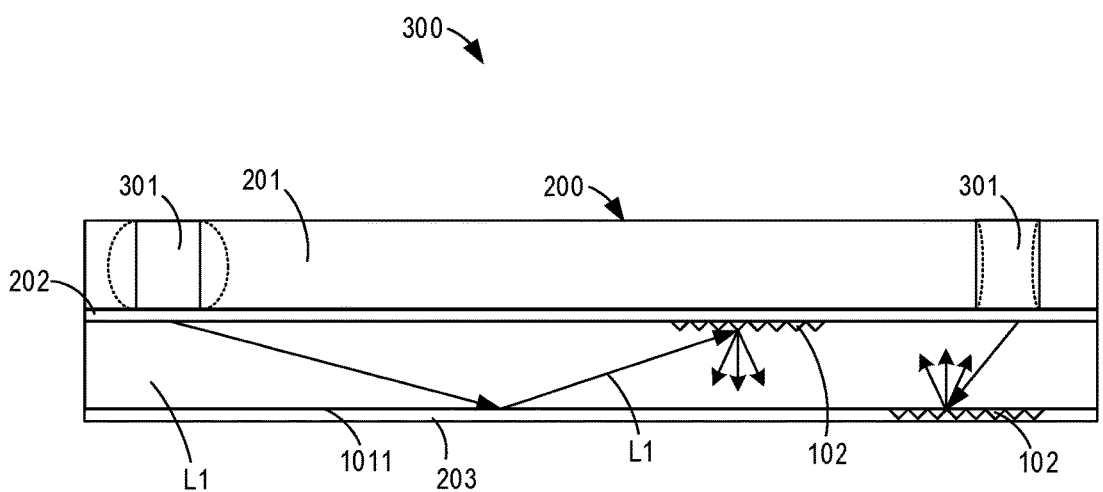

As shown in FIGS. 10 and 11, in some embodiments, the light guide layer 100 may be arranged on the surface of the glass body 201 via the interlayer 202 as described above. In some embodiments, the interlayer 202 may comprise an adhesive layer facilitating the attachment of the light guide layer 100 to the surface of the glass body 201. The interlayer 202 may be made by polyvinyl butyral (PVB) or ethylene-vinyl acetate copolymer (EVA), to allow the vehicle glass 200 to be manufactured cost-effectively. In some embodiments, in addition to bonding the light guide layer 100 and the glass body 201, the interlayer 202 may also comprise layers with other functions, comprising but not limited to, an electro-transparency layer, an electro-chromic layer, a heat-reflecting layer or a low emissivity layer etc., to further enrich the functions of the vehicle glass and improve the lighting effects.

In some embodiments, when the microstructure portion 102 is arranged on a surface adjacent to the interlayer 202, the refractive index of the interlayer 202 is different from that of the microstructure portion 102, which further improves the lighting effect. Different refractive indices may be achieved by selecting a suitable material for the interlayer 202 and/or microstructure portion 102. For example, the microstructure portion 102 and the interlayer 202 may be manufactured using materials with different refractive indices.

It is to be explained that in embodiments where the light diffusion part is implemented as suspended particles 103, there are no restrictions over the refractive indices of the suspended particles 103 and the adjacent interlayer 202, i.e., they may be the same or different. With respect to the suspended particles 103, as stated above, the different refractive indices between the suspended particles 103 and the transparent body 101 in which the suspended particles are positioned may improve lighting effect.

In the case where the light guide layer 100 is arranged on the surface of the glass body 201 through the interlayer 202, the vehicle glass 200 may also comprise a protective layer 203 disposed on a surface of the light guide layer 100 away from the glass body 201 in some embodiments, as shown in FIGS. 10 and 11. The protective layer 203 can protect the light guide layer 100 from being scratched and damaged by the outside foreign matters, so as to ensure integrity of the microstructure portion 102 and the transmittance of the optical path, to thereby ensure the lighting effect. In some embodiments, the protective cover 203 may be made of materials with a high transmittance. For example, the protective cover 203 may be manufactured using the material having a transmittance above 95% (e.g., 98%).

It should be understood that the protective layer 203 as well as the medium, comprising but not limited to the first or second glass layer, the transparent body 101, the interlayer 202 etc., contained in the optical path along which the light is diffusely reflected, scattered or refracted by the light diffusion part and then emitted from the vehicle glass may all be made of materials having a transmittance above a predetermined threshold, so as to improve the lighting effect.

FIGS. 10 and 11 also illustrate several example embodiments showing the position of the light source 301 arranged in the vehicle interior lighting system 300 in the case where the light guide layer 100 is arranged on the surface of the glass body 201 through the interlayer 202. Although the possible arrangement of the light source 301 is depicted merely by examples of the microstructure portion 102 as the light diffusion part in the drawings, it is to be understood that the arrangement of the light source 301 is also similar in embodiments where the light diffusion part comprises suspended particles and/or the ink portion, and will not be repeated in the following text.

As shown in FIG. 10, in some embodiments, the light source 301 may be arranged adjacent to at least a part of the vehicle glass 200. For example, in some embodiments, when the light guide layer 100 is applied to the sunroof glass, the light source 301 may be arranged in a non-visible area around the sunroof glass. The non-visible area refers to an area of the vehicle glass 200 located in the ceiling of the vehicle or inside other opaque structures. In some embodiments, the non-visible area may also refer to the opaque area of the vehicle glass 200 per se. The non-visible area is often arranged around the vehicle glass 200.

Taking the sunroof glass as an example, the light source 301 may be arranged in the non-visible area around the sunroof glass, comprising a continuum light source 301, or a linear light source 301 or a point light source 301 arranged at the edge of the sunroof glass. Besides, the light source 301 may be next to the edge of the sunroof glass or kept away from the edge of the sunroof glass by a predetermined distance. The continuum light source 301 refers to a non-interrupted light source 301 arranged at at least one edge of the vehicle glass 200, while the point light source 301 indicates light sources 301 disposed in a dot style near the vehicle glass 200 at a given interval. To improve the lighting effect, it is advantageous to arrange the light source 301 next to the edge of the vehicle glass 200. On the one hand, more light-source light L1 would enter inside the transparent body 101 and propagate therein, to improve the lighting effect. On the other hand, the above arrangement allows the light source 301 and the vehicle glass 200 to be manufactured integrally, which facilitates the assembling of the vehicle glass 200.

Of course, it is advantageous for the customization of the vehicle and the vehicle glass 200 to dispose the light source 301 away from the edge of the sunroof glass by a given distance. For example, in some embodiments, the vehicle glass 200 and the surrounding light source 301 may be provided with various configurations by being separately assembled and mounted as well as through reserved interfaces and/or optical paths. For example, the vehicle in low class may be equipped with ordinary vehicle glass 200 free of the light guide layer 100. Users may choose to add the light guide layer 100 or the vehicle glass 200 having the light guide layer 100 to the low-class vehicle, and simultaneously set the light source 301 at the reserved position (e.g., an area of the ceiling near the sunroof glass), to upgrade the existing vehicle interior lighting system to the vehicle interior lighting system 300 capable of illuminating with the vehicle glass 200. In this event, the light source 301 is arranged to radiate the light-source light L1 into the transparent body 101 through suitable interfaces and/or optical paths, thereby illuminating the interior of the vehicle through the light guide layer 100 of the vehicle glass 200.

It is to be understood that the above arrangement of the light source 301 relative to the vehicle glass 200 is merely illustrative, without suggesting any limitation as to the scope of the present disclosure. Other suitable arrangement or structure is also feasible. For example, in some alternative embodiments, the light source 301 may also be arranged in the vehicle glass 200, as shown in FIG. 3. In some embodiments, the light source 301 may be implemented in the form of encapsulation or subcomponents.

FIG. 11 illustrates embodiments in which the light source 301 is arranged in the glass body 201. In these embodiments, the glass body 201 may be provided with a light-source hole for receiving at least a part of the light source 301. Integrating the light source 301 into the glass body 201 can further increase the integration level of the vehicle glass 200, thereby facilitating the assembling of the vehicle glass 200 to the vehicle.

In some embodiments, the light-source hole may be processed to adapt to the shape of the light source 301. For example, in some embodiments, the light-source hole may have the shape of a strip to receive the continuum light source 301. In some alternative embodiments, the light-source hole may also be a circular hole for receiving the point light source 301. The circular shape herein refers to a cross-sectional shape of the light-source hole in a plane parallel to the glass body 201. Besides the circular shape, the cross-sectional shape of the light-source hole in the plane parallel to the glass body 201 comprises, but is not limited to, circle, ellipse, strip, triangle, rectangle, pentagon, five-pointed star, hexagon and octagon etc.

Furthermore, in some embodiments, the light-source hole may have a rectangular cross-sectional shape in the plane perpendicular to the glass body 201 as demonstrated by the solid lines in FIG. 11. Such arrangement makes the manufacturing of the light-source hole and even the entire vehicle glass 200 easier. In some alternative embodiments, the cross-sectional shape of the light-source hole in the plane perpendicular to the glass body 201 may be convex outwardly, as shown by the dotted lines drawn on the left side of FIG. 11 for illustrating the light-source hole. Alternatively or additionally, in some embodiments, the sectional shape of the light-source hole on the plane perpendicular to the glass body 201 may be concave inwardly, e.g., concave ellipse shown by the dotted lines on the right side of FIG. 11. The inward concave or outward convex, for example, the convex ellipse shape of the light-source hole may facilitate the light light-source light L1 to enter the transparent body 101 and further propagate within it by having certain function of a lens. In some alternative embodiments, the cross-sectional shape of the light-source hole in the plane perpendicular to the glass body 201 also may be trapezoidal. That is, an opening area of the light-source hole may gradually increase or decrease from one surface of the glass to another surface. This arrangement facilitates design and assembling of the light source 301.

FIGS. 10 and 11 illustrate the vehicle glass 200 used in the vehicle interior lighting system 300 adopts the case where the light guide layer 100 is arranged on the surface of the glass body 201. Likewise, FIGS. 12 to 14 demonstrate the case where the light guide layer 100 is arranged within the vehicle glass 200. In the embodiments shown by FIGS. 12-14, the glass body 201 adopts the case where at least two glass layers are included, which is quite common in the art. To facilitate the description, the concept of the present disclosure will be described by taking the glass body 201 having two glass layers (hereinafter referred to "first glass layer 2011" and "second glass layer 2012" respectively) as an example. It is to be understood that the case of more than two glass layers is also similar and will not be repeated again in the following text.

Figure 12:
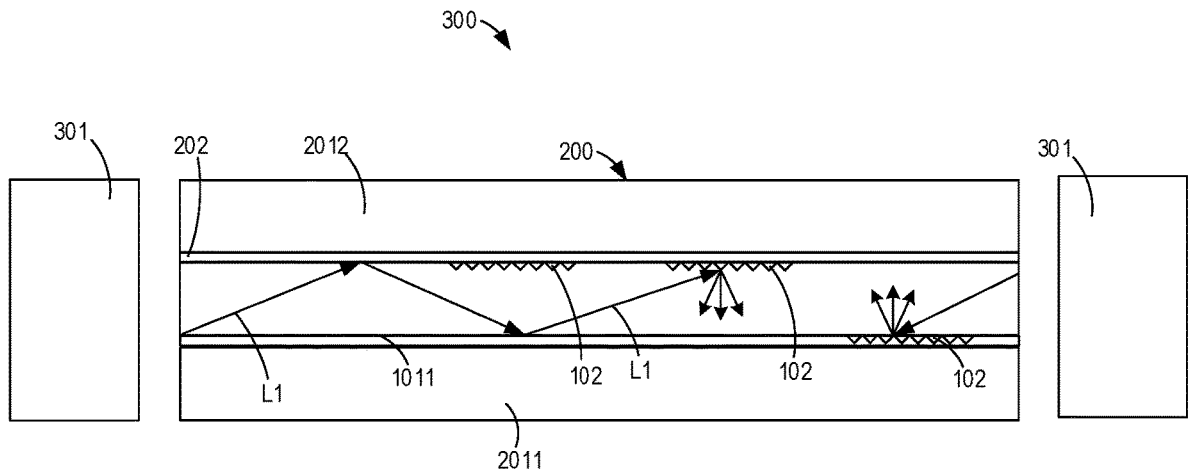
Figure 14:
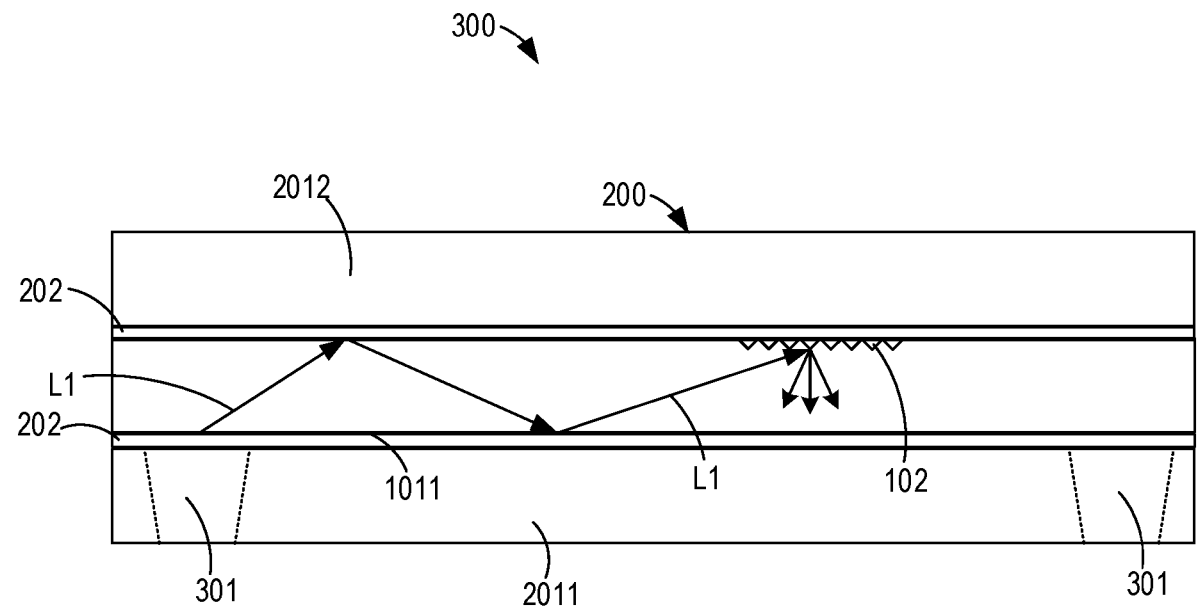

As shown in FIGS. 12 and 14, in some embodiments, the light guide layer 100 is arranged between the first glass layer 2011 and the second glass layer 2012 via the interlayer 202. Likewise, the interlayer 202 may be an adhesive layer that facilitates attachment of the light guide layer 100 to the inner surfaces of the first glass layer 2011 and the second glass layer 2012 as described above. The interlayer 202 may be made of polyvinyl butyral (PVB), ethylene-vinyl acetate copolymer (EVA), to allow the vehicle glass 200 to be manufactured in a cost-effective way.

Similar to the case where the light guide layer 100 is arranged on the surface of the glass body 201, in some embodiments, the microstructure portion 102 has a refractive index different from that of the interlayer 202 adjacent to the microstructure portion 102. This can further enhance the lighting effect. The different refractive indices may be implemented by selecting suitable materials for the interlayer 202 and/or the microstructure portion 102. For example, the microstructure portion 102 and the interlayer 202 may be made of materials having different refractive indices.

Figure 13:
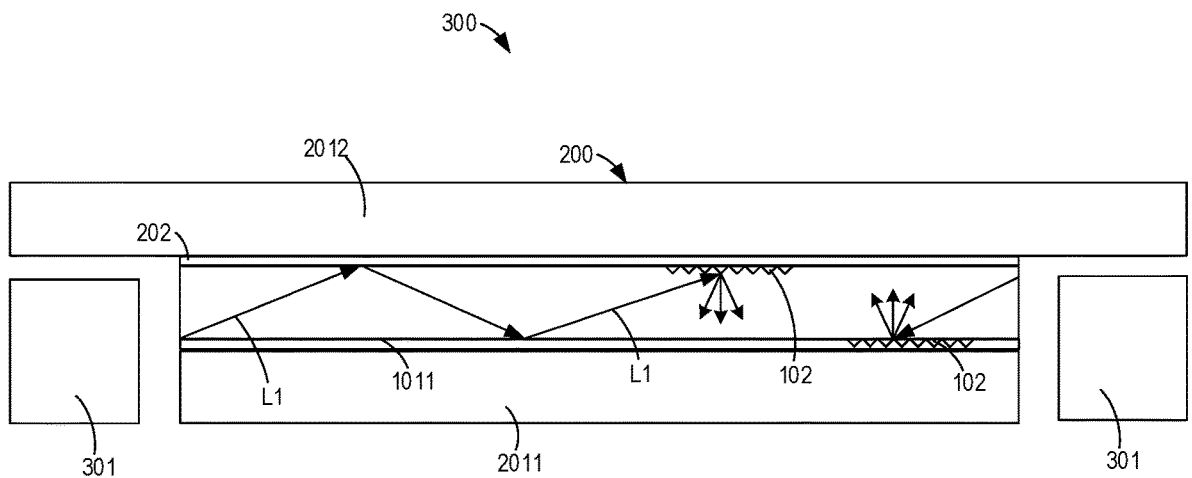

When the light guide layer 100 is arranged between the first glass layer 2011 and the second glass layer 2012, the light source 301 may also be arranged in various ways. As shown in FIGS. 12 and 13, in some embodiments, the light source 301 may be arranged adjacent to at least a part of the vehicle glass 200. For example, in some embodiments, the light source 301 may be arranged around the entire vehicle glass 200, e.g., in the non-visible area as shown in FIG. 12.

The above arrangement facilitates the integrated manufacturing of the vehicle glass 200 having the light guide layer 100 and facilitates the assembling of the vehicle glass 200 to the vehicle. Similarly, in some embodiments, the light source 301 may comprise a continuum light source 301 or a point light source 301, and may be positioned next to the edge of the vehicle glass 200 or away from the edge of the vehicle glass 200 by a predetermined distance.

In some embodiments, the light source 301 may also be arranged around only one of the glass layers in the vehicle glass 200, e.g., the first glass layer 2011, as shown in FIG. 13. The arrangement is particularly applicable for the case where the two glass layers are made by glass with different transmittance. In these embodiments, the second glass layer 2012 is larger than the first glass layer 2011, and the light source 301 is arranged in an area of difference therebetween. In addition to including the size of the second glass layer 2012 being generally larger than that of the first glass layer 2011, the above arrangement may further include that the size of the second glass layer 2012 is basically identical to that of the first glass layer 2011 but is only larger than the size of the first glass layer 2011 at local areas.

For example, in some embodiments, the first glass layer 2011 may comprise a plurality of recess areas arranged at edges. It is apparent that the second glass layer 2012 has a size larger than the first glass layer 2011 in these recess areas. The light source 301 may be arranged in the recess areas. This arrangement may further improve the integration level of the vehicle glass 200.

In embodiments where the light source 301 is arranged only around the first glass layer 2011 of the vehicle glass 200 as mentioned above, the light guide layer 100 may have the same size and shape as the first glass layer 2011. Of course, in some alternative embodiments, the light guide layer 100 may also have the same size and shape as the second glass layer 2012. Both of the above situations do not affect the lighting effect of the light guide layer 100 to allow more flexible arrangement of the light guide layer 100.

In some alternative embodiments, the light source 301 may also be arranged in at least one of the first glass layer 2011 and the second glass layer 2012. FIG. 14 illustrates embodiments where the light source 301 is arranged in the first glass layer 2011. As shown, in these embodiments, the first glass layer 2011 and/or the second glass layer 2012 may be provided with a light-source hole for receiving at least a part of the light source 301. Integrating the light source 301 into the first glass layer 2011 and/or the second glass layer 2012 may further improve the integration level of the vehicle glass 200, which further facilitates assembling of the vehicle glass 200 to the vehicle.

Similar to embodiments as shown in FIG. 11, in some embodiments, the light-source hole in the first glass layer 2011 and/or the second glass layer 2012 may also be processed to adapt to the shape of the light source 301. For example, in some embodiments, the cross-sectional shape of the light-source hole in the plane parallel to the glass body 201 comprises, but is not limited to, circle, ellipse, strip, triangle, rectangle, pentagon, five-pointed star, hexagon and octagon etc.

Also, like embodiments as shown in FIG. 11, the light-source hole in the first glass layer 2011 and/or second glass layer 2012 may have a rectangular cross-sectional shape in the plane perpendicular to the glass body 201 to facilitate the manufacturing of the light-source hole and even the first glass layer 2011 and the second glass layer 2012. In some alternative embodiments, the cross-sectional shape of the light-source hole in the plane perpendicular to the glass body 201 may be concave inwardly or convex outwardly, which facilitates the light-source light L1 to enter the transparent body 101 and further propagate within it. In some alternative embodiments, the cross-sectional shape of the light-source hole in the plane perpendicular to the glass body 201 may also be trapezoidal, so as to facilitate design and assembly of the light source 301.

For example, in some embodiments, as demonstrated by the dotted lines in FIG. 14, the opening area of the light-source hole in the first glass layer 2011 gradually increases along a direction towards the second glass layer 2012. Correspondingly, the light source installed therein may have a conical shape matching with it. The above arrangement allows the light source 301 not to fall out from the light-source hole after assembled into the first glass layer 2011, so as to ensure the light source 301 to be assembled into the light-source hole more stably.

The vehicle glass as mentioned above may also comprise a heat-reflecting layer 204 and/or a low emissivity layer 205. The heat-reflecting layer 204 may be made of suitable materials such as silver to improve the thermal comfort within the vehicle by light reflection and/or heat radiation, to thereby provide the thermal comfort function. The low emissivity layer 205 is a film product consisting of a plurality of layers of metal or other compounds, and is characterized by a high transmittance for visible light, a high reflectivity for mid and far infrared rays, excellent heat isolating effects and satisfactory transmittance.

Figure 15:
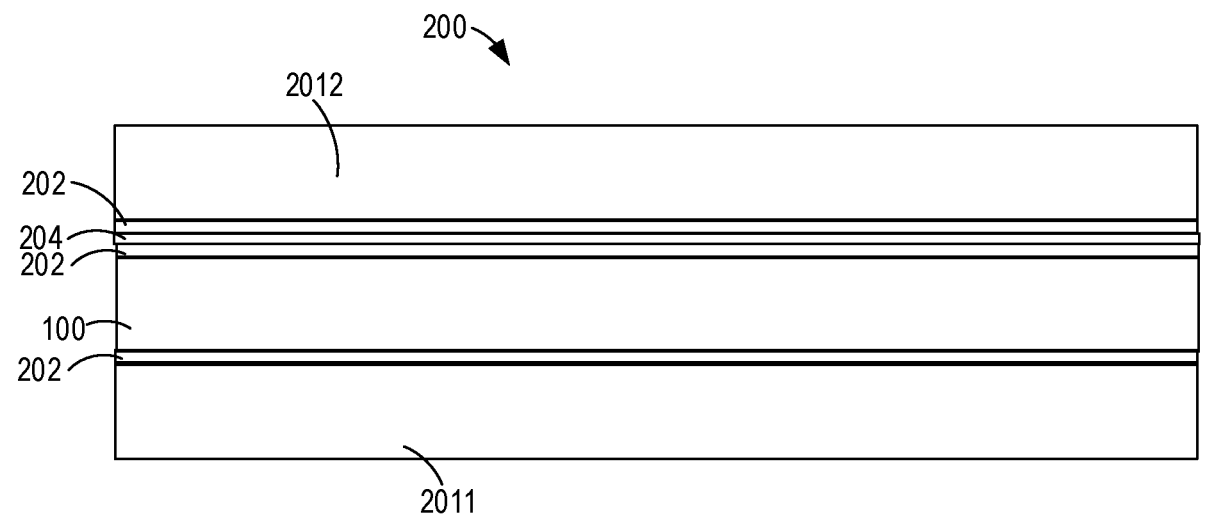
FIGS. 15 to 19 illustrate schematic diagrams of the vehicle glass in which a heat-radiating layer and/or a low emissivity layer are arranged in accordance with embodiments of the present disclosure.

The heat-reflecting layer 204 and/or low emissivity layer 205 may be arranged in the various arrangements of the vehicle glass described above in any suitable ways. Some example embodiments where the heat-reflecting layer 204 and/or low emissivity layer 205 are arranged in the vehicle glass will be described below with reference to FIGS. 15 to 19. In some embodiments, the heat-reflecting layer 204 and/or low emissivity layer 205 may be applied into the vehicle glass or to the surface of the vehicle glass in any one of the forms comprising thin films, plating layers or coating layers. FIG. 15 illustrates embodiments where the light guide layer 100 is arranged between the first glass layer 2011 and the second glass layer 2012 of the vehicle glass 200. In these embodiments, the heat-reflecting layer 204 may be arranged via the interlayer 202 between the two glass layers in the form of a thin film, e.g., at one side of the light guide layer 100 adjacent to the second glass layer 2012.

Figure 16:
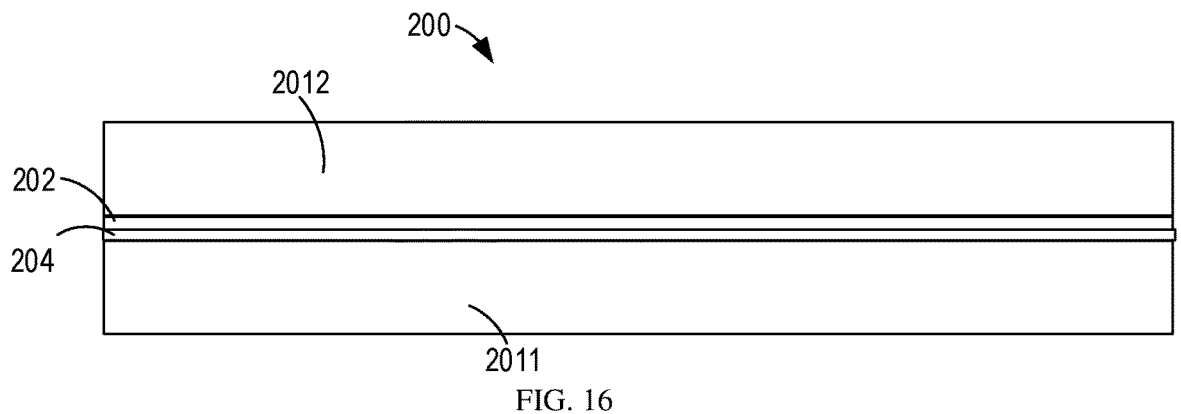
Figure 17:
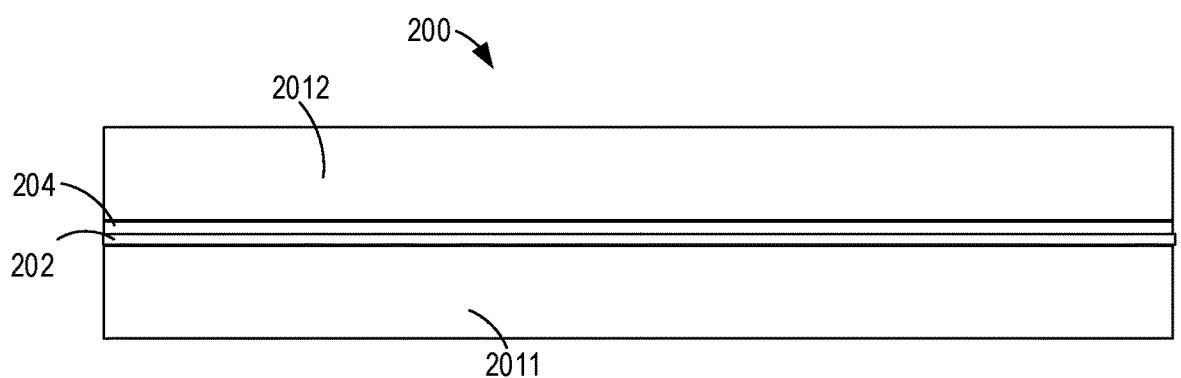

In some alternative embodiments, the heat-reflecting layer 204 may also be arranged on the surface of either of the first glass layer 2011 or the second glass layer 2012 in the form of a plating layer or a coating layer, as shown in FIGS. 16 and 17. FIG. 16 illustrates embodiments where the heat-reflecting layer 204 is applied on the outer surface of the first glass layer 2011 by plating or coating and then bonded to the second glass layer 2012. FIG. 17 demonstrates embodiments where the heat-reflecting layer 204 is applied on the outer surface of the second glass layer 2012 by plating or coating and then bonded to the first glass layer 2011.

Figure 18:
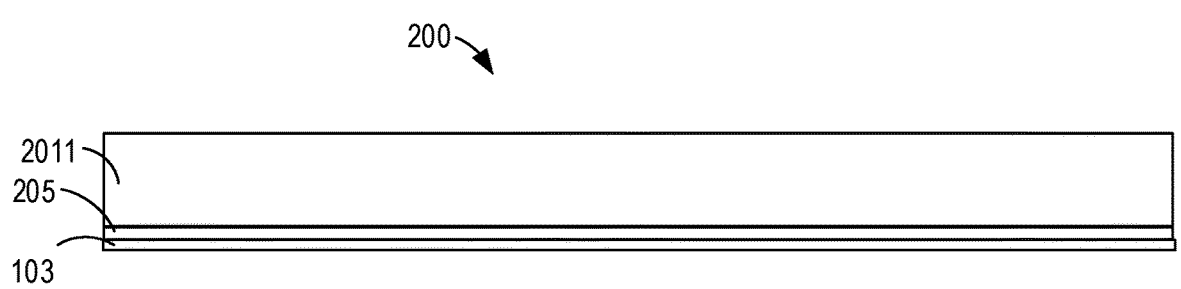
Figure 19:
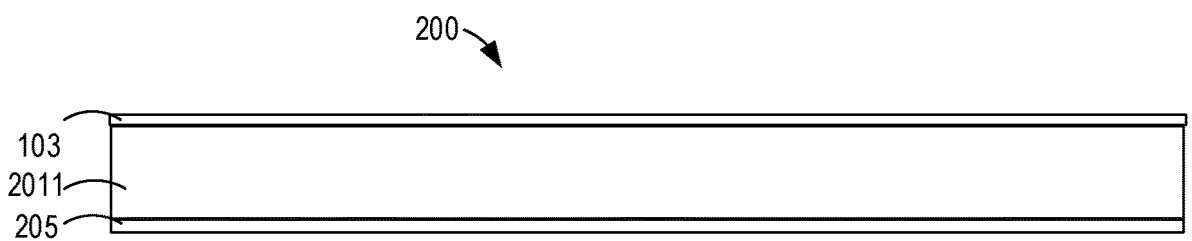

FIGS. 18 and 19 illustrate some example arrangements of the low emissivity layer 205 in the vehicle glass. As shown in FIG. 18, the low emissivity layer 205 may be applied, in the form of a coating layer, to the exterior of the inner surface of the first glass layer 2011 facing the interior of the vehicle, with the first glass layer facing towards the interior of the vehicle. Afterwards, the ink portion 103 may be applied to the exterior of the low emissivity layer 205. In the case where the ink portion 103 may be applied to the exterior of the low emissivity layer 205, the materials of the ink portion 103 and the low emissivity layer 205 are compatible.

Compatibility means that no reaction, or only a very few acceptable reactions, can occur between the ink portion 103 and the low emissivity layer 205 and the bonding force between the ink portion 103 and the low emissivity layer 205 will not be affected. It is to be understood that this is merely illustrative, and any other suitable arrangement is also feasible. For example, in some alternative embodiments, the ink portion 103 and the low emissivity layer 205 may be separately applied to the two surfaces of the first glass layer 2011 as shown in FIG. 19. In other words, the ink portion 103 may be arranged on the exterior and the interior of the vehicle glass. The exterior herein is indicated relative to the inside of the vehicle glass, comprising the exterior facing the inside of the vehicle and the exterior facing the outside of the vehicle. The ink portion 103 arranged on the interior of the vehicle glass means that, in the case where the vehicle glass refers to the laminated glass, the ink portion 103 may be arranged between the laminated glass.

In some embodiments, the ink portion 103 is compatible with the bending temperature, e.g., above 600° C.

In some embodiments, the ink portion, for example, has an L* value greater than 58 in color space CIELAB under reflection mode. The Lab color space consists of three elements, comprising illuminance L* and colors a* and b*, wherein L* indicates illuminance which is equivalent to brightness, a* represents a range from carmine to green and b* denotes a range from yellow to blue. L has a value domain in a range of 0 to 100. When L=50, it is equivalent to 50% black. A reasonable choice over the L* of the ink portion may lead to a better lighting effect.

In some embodiments, the ink portion 103 may also be provided with an anti-sticky property by selecting a suitable material. The anti-sticky property can prevent the ink portion 103 from sticking to other glass layers not provided with the ink portion 103, or from sticking to molds for manufacturing the vehicle glass 20 or the conveyors, to thereby allow the vehicle glass 200 to be manufactured more easily.

Furthermore, in some embodiments, the color and the transparency of the ink portion 103 may also be appropriately selected to adapt to various situations as demanded. For example, in some embodiments, the ink portion 103 may be black, white, colored, colorless and transparent, colored and semi-transparent or colorless and semi-transparent. For example, in the case where the vehicle glass 200 is required to achieve refracted lighting, the color of the ink portion 103 may be selected to be colorless and transparent to improve the lighting effect.

It is to be understood that FIGS. 15 to 19 illustrate several example embodiments of the heat-reflecting layer 204 and the low emissivity layer 205 through simplified schematic diagrams. The several embodiments are non-exhaustive and the heat-reflecting layer 204 and the low emissivity layer 205 may be arranged in the vehicle glass 200 in any suitable ways. The heat-reflecting layer 204 and the low emissivity layer 205 as shown in FIGS. 15 to 19 may be interchangeable. In addition, it is to be understood that other layers or structures of the vehicle glass 200 are not shown in FIGS. 15 to 19, for a prominent illustration of the heat-reflecting layer 204 and the low emissivity layer 205.

It is also to be understood that the above detailed embodiments of the present disclosure are provided only for illustrating or explaining the principles of the present disclosure by examples, rather than restricting the present disclosure. Any modifications, equivalent substitutions, improvements and the like should be encompassed within the protection scope of the present disclosure as long as they are within the spirit and principle of the present disclosure. Meanwhile, the claims attached to the present disclosure are intended to cover all changes and modifications within scope and border of the claims or equivalents thereof.

We claim:

1. A light guide layer for a vehicle glass, comprising:
   a transparent body comprising a first surface and a second surface arranged opposite to each other, and adapted to be coupled to the vehicle glass, the transparent body being configured to receive light-source light emitted from a light source arranged at a predetermined position of a vehicle and allow the light-source light to propagate within the transparent body; and
   a light diffusion part integrally formed in the transparent body or on at least one of the first surface and the second surface and configured to diffusely reflect, scatter and/or refract the light-source light propagating to the light diffusion part to a predetermined area of at least one of the first surface and the second surface, so as to emit the light-source light out from the predetermined area.

2. The light guide layer of claim 1, wherein the light diffusion part comprises a microstructure portion arranged on at least one of the first surface and the second surface, and wherein the microstructure portion is configured to diffusely reflect or scatter the light-source light propagating to the microstructure portion to the predetermined area of at least one of the first surface and the second surface while allowing light propagating in a direction perpendicular to the first surface or the second surface to pass therethrough.

3. The light guide layer of claim 2, wherein the microstructure portion comprises at least one of:
   protrusions formed on at least one of the first surface and the second surface by additive manufacturing;
   recesses formed on at least one of the first surface and the second surface by subtractive manufacturing; and/or
   wherein the microstructure portion is micrometer-sized or nanometer-sized; and/or
   wherein the microstructure portion is formed on at least one of the first surface and the second surface by at least one of machining, chemical etching, photolithography and UV gel curing.

4. The light guide layer of claim 1, wherein the transparent body is prefabricated to have a curvature matching with a curvature of the vehicle glass; and/or
   wherein the transparent body is adapted to be coupled to a visible area of the vehicle glass; and/or
   wherein the transparent body is adapted to be arranged on a surface of the vehicle glass, or wherein the vehicle glass comprises a laminated glass in which the transparent body is arranged; and/or
   wherein the light guide layer is crease-resistant; and/or
   wherein the light guide layer is ductile; and/or
   the light guide layer further comprises a heating-reflecting layer and/or a low emissivity layer arranged on a surface of the light guide layer.

5. The light guide layer of claim 1, wherein the transparent body is deformable so as not to affect changes of a direction of the light-source light made by the microstructure portion in a case where the transparent body is deformed to have a curvature matching with a curvature of the vehicle glass.

6. The light guide layer of claim 1, wherein the light diffusion part comprises suspended particles arranged in the transparent body.

7. The light guide layer of claim 6, wherein the transparent body is made by at least one of: polyethylene terephthalate (PET), polycarbonate (PC), polymethyl methacrylate (PMMA), polyvinyl butyral (PVB), ethylene-vinyl acetate copolymer (EVA), thermoplastic polyurethane elastomer (TPU) and terephthalic acid (TPA).

8. The light guide layer of claim 7, wherein the vehicle glass comprises a laminated glass and the transparent body is an interlayer between a first glass layer in the laminated glass facing interior of the vehicle and a second glass layer facing exterior of the vehicle.

9. The light guide layer of claim 1, wherein the light diffusion part comprises an ink portion arranged on at least one of the first surface and the second surface.

10. The light guide layer of claim 9, wherein the ink portion has anti-sticky property; and/or
wherein the ink portion is compatible with a bending temperature; and/or
wherein the ink portion has an L* value greater than 58 in a color space LAB.

11. A vehicle glass, comprising:
a glass body; and
the light guide layer of claim 1.

12. The vehicle glass of claim 11, wherein the light guide layer is arranged on a surface of the glass body via an interlayer; and/or
the vehicle glass further comprises a protective layer arranged on a surface of the light guide layer away from the glass body; and/or
wherein the glass body is provided with a light-source hole for receiving at least a part of a light source, preferably, the light-source hole is formed such that the light source received in the light-source hole is arranged in a non-visible area of the vehicle glass; and/or
the vehicle glass further comprises a heating-reflecting layer and/or a low emissivity layer arranged inside or on a surface of the vehicle glass.

13. The vehicle glass of claim 11, wherein the glass body comprises a first glass layer and a second glass layer, and
the light guide layer is arranged between the first glass layer and the second glass layer via an interlayer, or
the light guide layer is an interlayer that bonds the first glass layer with the second glass layer.

14. The vehicle glass of claim 13, wherein the light guide layer is arranged between the first glass layer and the second glass layer via the interlayer, the light diffusion part comprises a microstructure portion arranged on at least one of the first surface and the second surface, and wherein the microstructure portion is configured to diffusely reflect, scatter and/or refract the light-source light propagating to the microstructure portion to a predetermined area of at least one of the first surface and the second surface while allowing light propagating in a direction perpendicular to the first surface or the second surface to pass therethrough, wherein the interlayer has a refractive index different from the microstructure portion.

15. A vehicle interior lighting system, comprising:
the vehicle glass according to claim 11; and
a light source arranged adjacent to at least a part of the vehicle glass and/or inside the vehicle glass.

16. The vehicle interior lighting system of claim 15, wherein the light source comprises at least one of a continuum light source, a linear light source and a point light source; and/or
wherein the light source is arranged around at least one of first glass layer and second glass layer of the vehicle glass; and/or
wherein at least a part of the vehicle glass comprises a light guide layer; and/or
wherein the light source is arranged in at least one of first glass layer and second glass layer of the vehicle glass via a light-source hole.

17. A vehicle glass, comprising:
a glass body comprising a first surface and a second surface arranged opposite to each other, and configured to receive light-source light emitted from a light source arranged at a predetermined position of a vehicle and allow the light-source light to propagate within the glass body; and
a light diffusion part integrally formed in the glass body or on at least one of the first surface and the second surface and configured to diffusely reflect, scatter and/or refract the light-source light propagating to the light diffusion part to a predetermined area of at least one of the first surface and the second surface, so as to emit the light-source light out from the predetermined area.

18. The vehicle glass of claim 17, wherein the light diffusion part comprises a microstructure portion arranged on at least one of the first surface and the second surface, wherein the microstructure portion is configured to diffusely reflect, scatter and/or refract the light-source light propagating to the microstructure portion to a predetermined area of at least one of the first surface and the second surface while allowing light propagating in a direction perpendicular to the first surface or the second surface to pass therethrough.

19. The vehicle glass of claim 17, wherein the light diffusion part comprises an ink portion arranged on at least one of the first surface and the second surface; and/or
wherein the light diffusion part comprises a coating layer or a plating layer applied to a surface of the vehicle glass or to interior of the vehicle glass; and/or
wherein the light diffusion part comprises suspended particles arranged in the glass body; and/or
the vehicle glass further comprises a heating-reflecting layer and/or a low emissivity layer arranged inside or on a surface of the vehicle glass.

20. The light guide layer of claim 19, wherein the ink portion has anti-sticky property; and/or
wherein the ink portion is compatible with a bending temperature; and/or
wherein the ink portion has an L* value greater than 58 in a color space LAB.

* * * * *